US008195428B2

(12) United States Patent
Kamdar et al.

(10) Patent No.: US 8,195,428 B2
(45) Date of Patent: Jun. 5, 2012

(54) METHOD AND SYSTEM FOR PROVIDING AUTOMATED VEHICLE DIAGNOSTIC FUNCTION UTILIZING A TELEMATICS UNIT

(75) Inventors: Hitan S. Kamdar, Utica, MI (US); Russell A. Patenaude, Macomb Township, MI (US); Anthony J. Sumcad, Southfield, MI (US); Shpetim Veliu, Livonia, MI (US); Brad T. Reeser, Lake Orion, MI (US)

(73) Assignee: General Motors LLC, Detroit, MI (US)

( * ) Notice: Subject to any disclaimer, the term of this patent is extended or adjusted under 35 U.S.C. 154(b) by 1644 days.

(21) Appl. No.: 10/786,980

(22) Filed: Feb. 25, 2004

(65) Prior Publication Data

US 2005/0187680 A1 Aug. 25, 2005

(51) Int. Cl.
*G06F 11/30* (2006.01)

(52) U.S. Cl. ........................... 702/183; 701/35; 702/182

(58) Field of Classification Search .................... 702/71, 702/80–83, 93, 104, 113, 119, 180, 182–184; 701/24, 25, 29, 30, 33, 1, 35; 703/8
See application file for complete search history.

(56) References Cited

U.S. PATENT DOCUMENTS 5,491,631 A * 2/1996 Shirane et al. .................. 701/35
6,745,151 B2 * 6/2004 Marko et al. .................. 702/182
2005/0154500 A1 * 7/2005 Sonnenrein et al. .............. 701/1

OTHER PUBLICATIONS

Kelly Carroll, Data to ride shotgun: InfoMove helps connect cars to Internet, Telephony Dec. 13, 1999, Copyright 1999 by PRIMEDIA Business Magazines & Media Inc., “All Rights Reserved”, Telephony, Spectrum; ISSN: 0040-2656, 1091 words.
Seattle, InfoMove Delivers New Generation of Wireless Internet Services for the Car, Business Wire, Oct. 18, 1999, Copyright 1999 Business Wire, Inc. Business Wire, Business Editors/Technology Writers, 994 words.
Bob Low, Motoring in the new millennium on the Net, Daily Record, May 1, 1998, Copyright 1998 Scottish Daily Record & Sunday Mail Ltd., Daily Record May 1, 1998, Friday, p. 31 Road, 734 words.
Tarre Beach, New Products; SIDEBAR, Wireless Review Apr. 1, 2000, Copyright 2000 by PRIMEDIA Business Magazines & Media Inc., “All rights Reserved” Wireless Review, Apr. 1, 2000, New Products; ISSN: 1099-9248, 351 words.
Flint, Mich., Jan. 3, BUIC XP2000—A Concept Cat for the 21$^{st}$ Century, PR Newswire, Jan. 3, 1995, Copyright 1995 PR Newswire Association, Inc. PR Newswire, Jan. 3, 1995, Tuesday, Financial News, (With Photo) to Business and Auto Editors, 2149 words.

* cited by examiner

*Primary Examiner* — John H Le

(74) *Attorney, Agent, or Firm* — Anthony Luke Simon; Reising Ethington P.C.

(57) ABSTRACT

The present invention provides a method for providing automated vehicle diagnostic function within a mobile vehicle communication system. The method includes configuring a primary diagnostic script for a telematics equipped mobile vehicle, providing the primary diagnostic script to the mobile vehicle, executing the primary diagnostic script, and collecting diagnostic data based on the executed primary diagnostic script. The primary diagnostic script may recreate known problem sequences when executed or may trigger data capture when specific conditions exist. The step of configuring the primary diagnostic script may include determining at least one diagnostic script based on diagnostic options and retrieving the at least one determined diagnostic script. One or more diagnostic scripts may be combined into the primary diagnostic script.

9 Claims, 3 Drawing Sheets

METHOD AND SYSTEM FOR PROVIDING AUTOMATED VEHICLE DIAGNOSTIC FUNCTION UTILIZING A TELEMATICS UNIT

FIELD OF THE INVENTION

This invention relates generally to wireless communications with a mobile vehicle. More specifically, the invention relates to a method and system for providing automated vehicle diagnostic function utilizing a telematics unit within a telematics equipped mobile vehicle.

BACKGROUND OF THE INVENTION

The opportunity to utilize wireless features in a mobile vehicle is ever increasing as the automobile is being transformed into a communications and entertainment platform as well as a transportation platform. Wireless features include wireless vehicle communication and networking services for a mobile vehicle.

Typically, wireless systems within mobile vehicles (e.g. telematics units) provide voice communication. Recently, these wireless systems have been utilized to update systems within telematics units, such as, for example radio station presets.

Conventional diagnostic applications require the use of scarce or expensive technician assists to detect or recreate problems occurring within a mobile vehicle. The present invention advances the state of the art in telematics equipped mobile vehicles.

SUMMARY OF THE INVENTION

One aspect of the invention includes a method for providing automated vehicle diagnostic function within a mobile vehicle communication system. The method includes configuring a primary diagnostic script for a telematics equipped mobile vehicle, providing the primary diagnostic script to the mobile vehicle, executing the primary diagnostic script, and collecting diagnostic data based on the executed primary diagnostic script.

In accordance with another aspect of the invention, a computer readable medium storing a computer program includes: computer readable code for configuring a primary diagnostic script for a telematics equipped mobile vehicle; computer readable code for providing the primary diagnostic script to the mobile vehicle; computer readable code for executing the primary diagnostic script; and computer readable code for collecting diagnostic data based on the executed primary diagnostic script.

In accordance with yet another aspect of the invention, a system for automated vehicle diagnostic function is provided. The system includes means for configuring a primary diagnostic script for a telematics equipped mobile vehicle. Means for providing the primary diagnostic script to the mobile vehicle is provided. Means for executing the primary diagnostic script and means for collecting diagnostic data based on the executed primary diagnostic script is also provided.

The aforementioned, and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE DRAWINGS

Figure 1:
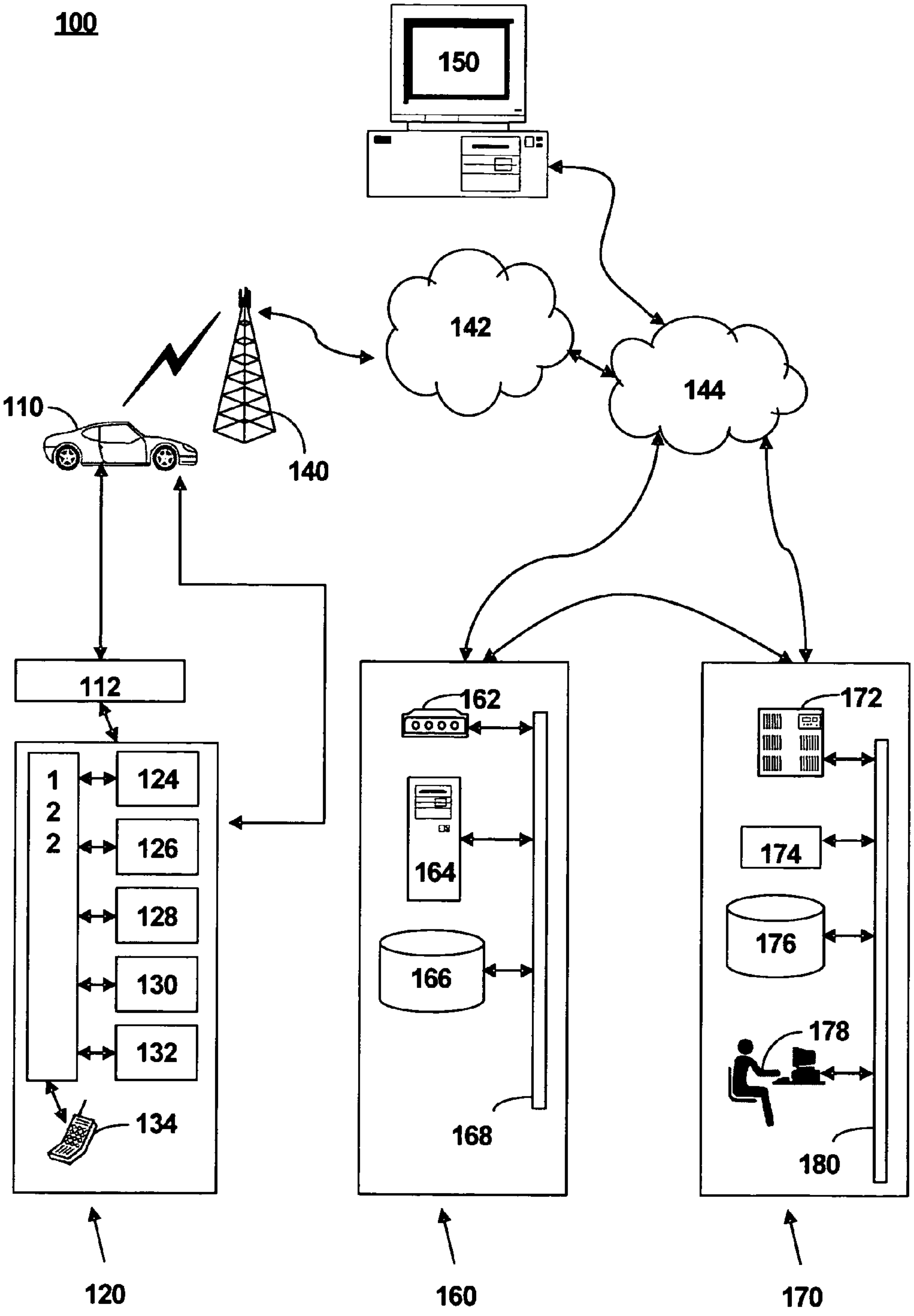
FIG. 1 illustrates an operating environment for implementing wireless communication within a mobile vehicle communication system.

FIG. 1 illustrates one embodiment of system for data transmission over a wireless communication system, in accordance with the present invention at 100. Mobile vehicle communication system (MVCS) 100 includes a mobile vehicle communication unit (MVCU) 110, a vehicle communication network 112, a telematics unit 120, one or more wireless carrier systems 140, one or more communication networks 142, one or more land networks 144, one or more client, personal or user computers 150, one or more web-hosting portals 160, and one or more call centers 170. In one embodiment, MVCU 110 is implemented as a mobile vehicle equipped with suitable hardware and software for transmitting and receiving voice and data communications. MVCS 100 may include additional components not relevant to the present discussion. Mobile vehicle communication systems and telematics units are known in the art.

MVCU 110 may also be referred to as a mobile vehicle throughout the discussion below. In operation, MVCU 110 may be implemented as a motor vehicle, a marine vehicle, or as an aircraft. MVCU 110 may include additional components not relevant to the present discussion.

MVCU 110, via a vehicle communication network 112, sends signals to various units of equipment and systems (detailed below) within MVCU 110 to perform various functions such as unlocking a door, opening the trunk, setting personal comfort settings, and calling from telematics unit 120. In facilitating interactions among the various communication and electronic modules, vehicle communication network 112 utilizes network interfaces such as controller-area network (CAN), International Organization for Standardization (ISO) Standard 9141, ISO Standard 11898 for high-speed applications, ISO Standard 11519 for lower speed applications, and Society of Automotive Engineers (SAE) Standard J1850 for high-speed and lower speed applications.

MVCU 110, via telematics unit 120, sends to and receives radio transmissions from wireless carrier system 140. Wireless carrier system 140 is implemented as any suitable system for transmitting a signal from MVCU 110 to communication network 142.

Telematics unit 120 includes a digital signal processor (DSP) 122 connected to a wireless modem 124, a global positioning system (GPS) unit 126, an in-vehicle memory 128, a microphone 130, one or more speakers 132, and an embedded or in-vehicle mobile phone 134. In other embodiments, telematics unit 120 may be implemented without one or more of the above listed components, such as, for example speakers 132. Telematics unit 120 may include additional components not relevant to the present discussion.

In one embodiment, DSP 122 is implemented as a microcontroller, controller, host processor, or vehicle communications processor. In an example, DSP 122 is implemented as an application specific integrated circuit (ASIC). In another embodiment, DSP 122 is implemented as a processor working in conjunction with a central processing unit (CPU) performing the function of a general purpose processor. GPS unit 126 provides longitude and latitude coordinates of the vehicle responsive to a GPS broadcast signal received from one or more GPS satellite broadcast systems (not shown). In-vehicle mobile phone 134 is a cellular-type phone, such as, for example an analog, digital, dual-mode, dual-band, multi-mode or multi-band cellular phone.

DSP 122 executes various computer programs that control programming and operational modes of electronic and mechanical systems within MVCU 110. DSP 122 controls communications (e.g. call signals) between telematics unit 120, wireless carrier system 140, and call center 170. In one embodiment, a voice-recognition application is installed in DSP 122 that can translate human voice input through microphone 130 to digital signals. DSP 122 generates and accepts digital signals transmitted between telematics unit 120 and a vehicle communication network 112 that is connected to various electronic modules in the vehicle. In one embodiment, these digital signals activate the programming mode and operation modes, as well as provide for data transfers. In this embodiment, signals from DSP 122 are translated into voice messages and sent out through speaker 132.

Communication network 142 includes services from one or more mobile telephone switching offices and wireless networks. Communication network 142 connects wireless carrier system 140 to land network 144. Communication network 142 is implemented as any suitable system or collection of systems for connecting wireless carrier system 140 to MVCU 110 and land network 144.

Land network 144 connects communication network 142 to client computer 150, web-hosting portal 160, and call center 170. In one embodiment, land network 144 is a public-switched telephone network (PSTN). In another embodiment, land network 144 is implemented as an Internet protocol (IP) network. In other embodiments, land network 144 is implemented as a wired network, an optical network, a fiber network, other wireless networks, or any combination thereof. Land network 144 is connected to one or more landline telephones. Communication network 142 and land network 144 connect wireless carrier system 140 to web-hosting portal 160 and call center 170.

Client, personal or user computer 150 includes a computer usable medium to execute Internet browser and Internet-access computer programs for sending and receiving data over land network 144 and optionally, wired or wireless communication networks 142 to web-hosting portal 160. Personal or client computer 150 sends user preferences to web-hosting portal through a web-page interface using communication standards such as hypertext transport protocol (HTTP), and transport-control protocol and Internet protocol (TCP/IP). In one embodiment, the data includes directives to change certain programming and operational modes of electronic and mechanical systems within MVCU 110.

In operation, a client utilizes computer 150 to initiate setting or re-setting of user-preferences for MVCU 110. In an example, a client utilizes computer 150 to provide radio station presets as user-preferences for MVCU 110. User-preference data from client-side software is transmitted to server-side software of web-hosting portal 160. User-preference data is stored at web-hosting portal 160.

Web-hosting portal 160 includes one or more data modems 162, one or more web servers 164, one or more databases 166, and a network system 168. Web-hosting portal 160 is connected directly by wire to call center 170, or connected by phone lines to land network 144, which is connected to call center 170. In an example, web-hosting portal 160 is connected to call center 170 utilizing an IP network. In this example, both components, web-hosting portal 160 and call center 170, are connected to land network 144 utilizing the IP network. In another example, web-hosting portal 160 is connected to land network 144 by one or more data modems 162. Land network 144 sends digital data to and from modem 162, data that is then transferred to web server 164. Modem 162 may reside inside web server 164. Land network 144 transmits data communications between web-hosting portal 160 and call center 170.

Web server 164 receives user-preference data from user computer 150 via land network 144. In alternative embodiments, computer 150 includes a wireless modem to send data to web-hosting portal 160 through a wireless communication network 142 and a land network 144. Data is received by land network 144 and sent to one or more web servers 164. In one embodiment, web server 164 is implemented as any suitable hardware and software capable of providing web services to help change and transmit personal preference settings from a client at computer 150 to telematics unit 120 in MVCU 110. Web server 164 sends to or receives from one or more databases 166 data transmissions via network system 168. Web server 164 includes computer applications and files for managing and storing personalization settings supplied by the client, such as door lock/unlock behavior, radio station preset selections, climate controls, custom button configurations and theft alarm settings. For each client, the web server potentially stores hundreds of preferences for wireless vehicle communication, networking, maintenance and diagnostic services for a mobile vehicle.

In one embodiment, one or more web servers 164 are networked via network system 168 to distribute user-preference data among its network components such as database 166. In an example, database 166 is a part of or a separate computer from web server 164. Web server 164 sends data transmissions with user preferences to call center 170 through land network 144.

Call center 170 is a location where many calls are received and serviced at the same time, or where many calls are sent at the same time. In one embodiment, the call center is a telematics call center, facilitating communications to and from telematics unit 120 in MVCU 110. In an example, the call center is a voice call center, providing verbal communications between an advisor in the call center and a subscriber in a mobile vehicle. In another example, the call center contains each of these functions. In other embodiments, call center 170 and web-hosting portal 160 are located in the same or different facilities.

Call center 170 contains one or more voice and data switches 172, one or more communication services managers 174, one or more communication services databases 176, one or more communication services advisors 178, and one or more network systems 180.

Switch 172 of call center 170 connects to land network 144. Switch 172 transmits voice or data transmissions from call center 170, and receives voice or data transmissions from telematics unit 120 in MVCU 110 through wireless carrier system 140, communication network 142, and land network 144. Switch 172 receives data transmissions from and sends data transmissions to one or more web-hosting portals 160. Switch 172 receives data transmissions from or sends data transmissions to one or more communication services managers 174 via one or more network systems 180.

Communication services manager 174 is any suitable hardware and software capable of providing requested communication services to telematics unit 120 in MVCU 110. Communication services manager 174 sends to or receives from one or more communication services databases 176 data transmissions via network system 180. Communication services manager 174 sends to or receives from one or more communication services advisors 178 data transmissions via network system 180. Communication services database 176 sends to or receives from communication services advisor 178 data transmissions via network system 180. Communication services advisor 178 receives from or sends to switch 172 voice or data transmissions.

Communication services manager 174 provides one or more of a variety of services including enrollment services, navigation assistance, directory assistance, roadside assistance, business or residential assistance, information services assistance, emergency assistance, automated vehicle diagnostic function, and communications assistance. Communication services manager 174 receives service-preference requests for a variety of services from the client via computer 150, web-hosting portal 160, and land network 144. Communication services manager 174 transmits user-preference and other data such as, for example primary diagnostic script to telematics unit 120 in MVCU 110 through wireless carrier system 140, communication network 142, land network 144, voice and data switch 172, and network system 180. Communication services manager 174 stores or retrieves data and information from communication services database 176. Communication services manager 174 may provide requested information to communication services advisor 178.

In one embodiment, communication services advisor 178 is implemented as a real advisor. In an example, a real advisor is a human being in verbal communication with a user or subscriber (e.g. a client) in MVCU 110 via telematics unit 120. In another embodiment, communication services advisor 178 is implemented as a virtual advisor. In an example, a virtual advisor is implemented as a synthesized voice interface responding to requests from telematics unit 120 in MVCU 110.

Communication services advisor 178 provides services to telematics unit 120 in MVCU 110. Services provided by communication services advisor 178 include enrollment services, navigation assistance, real-time traffic advisories, directory assistance, roadside assistance, business or residential assistance, information services assistance, emergency assistance, automated vehicle diagnostic function, and communications assistance. Communication services advisor 178 communicate with telematics unit 120 in MVCU 110 through wireless carrier system 140, communication network 142, and land network 144 using voice transmissions, or through communication services manager 174 and switch 172 using data transmissions. Switch 172 selects between voice transmissions and data transmissions.

In operation, an incoming call is routed to telematics unit 120 within mobile vehicle 110 from call center 170. In one embodiment, the call is routed to telematics unit 120 from call center 170 via land network 144, communication network 142, and wireless carrier system 140.

Figure 2:
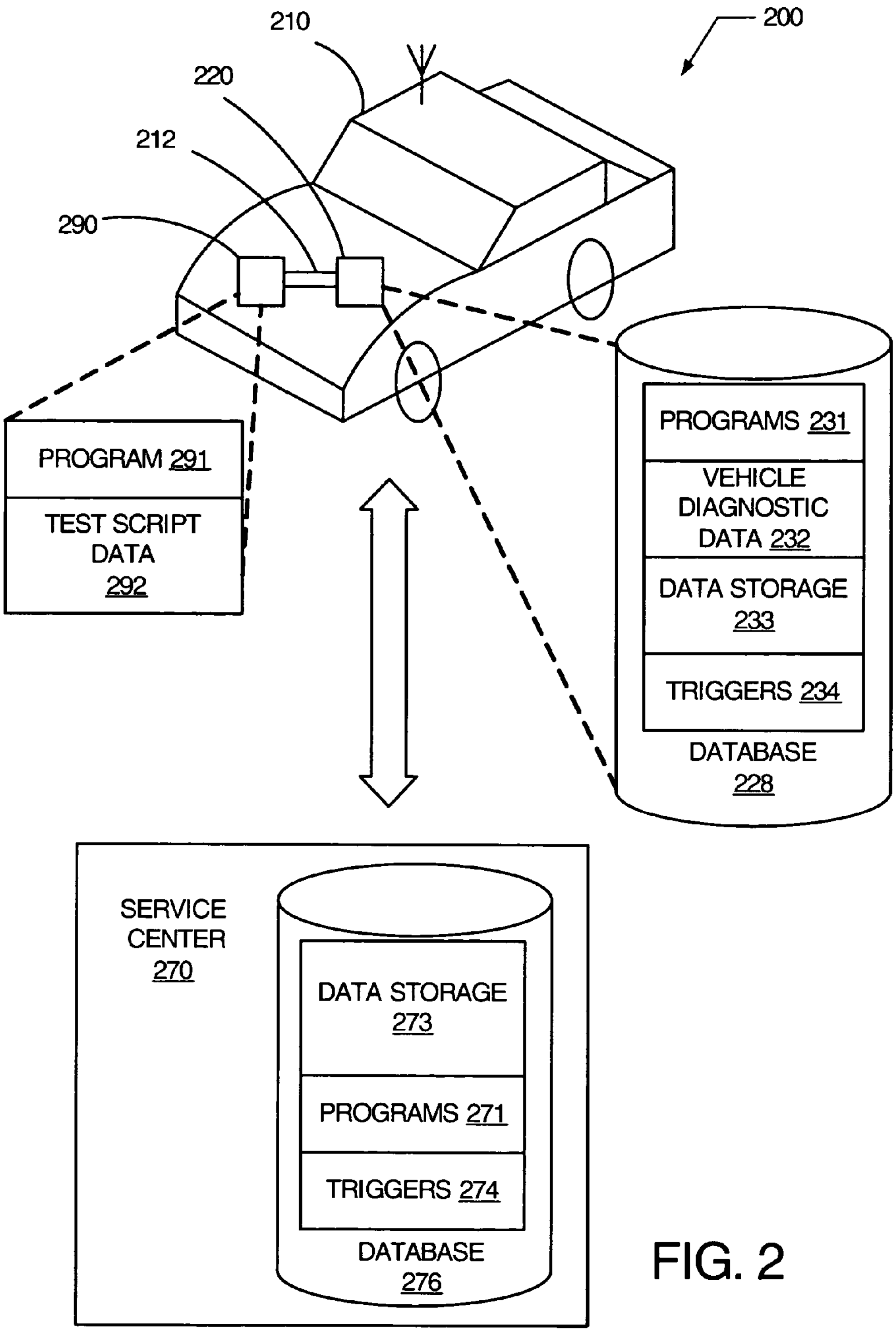
FIG. 2 is a block diagram of telematics based system in accordance with an embodiment of the present invention.

FIG. 2 is a block diagram of a telematics based system in accordance with an embodiment of the present invention. FIG. 2 shows a telematics based system 200 for providing automated vehicle diagnostic function utilizing a telematics unit within a telematics equipped mobile vehicle.

In FIG. 2, the system includes a mobile vehicle 210 having a telematics unit 220 coupled to one or more vehicle system modules 290 via a vehicle communication bus 212, a service provider 270, such as, for example a call center, a service center, and the like. Telematics unit 220 further includes a database 228 that contains programs 231, vehicle diagnostic data 232, data storage 233 and triggers 234. Vehicle system module (VSM) 290 further includes a program 291, test script data 292. In one embodiment, VSM 290 is located within telematics unit 220. Service provider 270 further includes an automated vehicle diagnostic function database 276 that contains programs 231, data storage 273, and triggers 274. In FIG. 2, the elements are presented for illustrative purposes and are not intended to be limiting. Telematics based system 200 may include additional components not relevant to the present discussion.

Telematics unit 220 is any telematics device enabled for operation with a telematics service provider, such as, for example telematics unit 120 as described with reference to FIG. 1. Telematics unit 220 in vehicle 210 is in communication with service provider 270 (e.g. a "service center"). Telematics unit 220 includes volatile and non-volatile memory components for storing data and programs. In one embodiment, memory components in telematics unit 220 contain database 228.

Database 228 includes one or more programs 231 for operating telematics unit 220, such as, for managing a portion of an automated vehicle diagnostic system utilizing a telematics unit. In operation, program 231 receives primary diagnostic script from service provider 270 at data storage 233. Program 231 executes the primary diagnostic script, such as, for example by parsing the primary diagnostic script, and collects diagnostic data responsive to the executed primary diagnostic script. In one embodiment, program 231 parses the primary diagnostic script and stores triggers at triggers 234 and transfers test data to VSM 290 for execution. In an example, program 231 executes the primary diagnostic script immediately upon reception of the primary diagnostic script. In another example, program 231 executes the primary diagnostic script at a predetermined time interval. In yet another example, program 231 executes the primary diagnostic script when a predetermined event occurs, such as, for example upon reception of a command from a user interface, such as, a voice command from a user or technician or a command received from an advisor at service provider 270.

Vehicle system module (VSM) 290 is any vehicle system control module having software and hardware components for operating, controlling or monitoring one or more vehicle systems. In one embodiment, VSM 290 is a sensor and provides diagnostic data collected from mobile vehicle 210. In another embodiment, VSM 290 is a global positioning system (GPS) module, such as, for example GPS unit 126 of FIG. 1, and provides location information to complement diagnostic data collected from mobile vehicle 210. In yet another embodiment, VSM 290 is a controller for controlling a vehicle system such as, for example, PCM control modules, vehicle interior and exterior illumination, sentencing and diagnostic modules, body control modules and additionally provides diagnostic data collected from mobile vehicle 210.

Vehicle system module 290 contains one or more processors, one or more memory devices and one or more connection ports. In one embodiment, VSM 290 includes a software switch for scanning received information, such as, for example sensor information to identify that data has been received. VSM 290 is coupled to a vehicle communication bus 212, and therefore to any other device that is also coupled to vehicle communication bus 212. The vehicle communication bus is also referred to as a vehicle communication network. In one embodiment, VSM 290 is directly coupled to telematics unit 220, such as, for example vehicle communication bus 212 coupling telematics unit 220 to vehicle system modules 290. In an example, vehicle communication bus 212 is a vehicle communication network 112 as described in FIG.

1, above. In another embodiment, VSM 290 is indirectly coupled to telematics unit 220.

In operation, program 231 parses the primary diagnostic script and transfers test data to test script data 292 within VSM 290 for execution by program 291. In one embodiment, program 291 executes the test data to diagnose existing trouble codes through vehicle interaction, such as, for example cycling power modes, modifying module settings, or other configurable parameters. In another embodiment, program 291 executes the test data to identify specific undesirable vehicle system operation by recreating sequences that cause known undesirable vehicle system operation in other similar vehicles. In yet another embodiment, program 291 executes the test data to collect diagnostic data related to intermittent undesirable vehicle system operation by triggering diagnostic data collection when defined conditions occur.

Service provider 270 is any service center providing telematics services such as service center 170 described with reference to FIG. 1. In one embodiment, service provider 270 includes hardware and software for managing database 276 as an automated vehicle diagnostic function database. In another embodiment, service center 270 is configured to access a database that is in another location but coupled to service center 270 such as, for example, database 166 in web server 160 as described in FIG. 1. Database 276 contains test and vehicle diagnostic data stored at data storage 273 and trigger event data stored at triggers 274. In one embodiment, database 276 includes one or more programs 231 for managing vehicle update data, for managing software update processes for various vehicle systems, for responding to vehicle software update requests, and for providing automated vehicle diagnostic function. In another embodiment, database 276 is a relational database that includes information, such as, for example vehicle makes and models, vehicle system modules for the makes and models, individual vehicle identification numbers (VIN) and other vehicle identifiers, vehicle system software for providing automated vehicle diagnostic function, and trigger event data specifying conditions for providing automated vehicle diagnostic function. The trigger is, for example, identification of diagnostic routines by an adviser in communication with a customer supplying a request.

In operation, service provider 270 manages the configuring and delivery of primary diagnostic script to a telematics equipped vehicle (e.g. mobile vehicle 210) within a mobile vehicle communication system (MVCS). In one embodiment, service provider 270 is enabled to concatenate, and otherwise manage, one or more diagnostic scripts providing automated vehicle diagnostic function to at least one mobile vehicle 210 within the MVCS. In operation, service provider 270 receives a request for automated vehicle diagnostic function from a user interface. In an example, service provider 270 receives a request for automated vehicle diagnostic function from a user utilizing a user interface. In another example, service provider 270 receives a request for automated vehicle diagnostic function from a technician utilizing a user interface.

The request initiates an automated vehicle diagnostic function. In one example, the request initiates an automated vehicle diagnostic function utilizing a live adviser. In another example, the request initiates an automated vehicle diagnostic function utilizing a virtual adviser. The advisor identifies diagnostic routines based on the received request. In one example, the advisor identifies diagnostic routines by presenting high level questions to the client/technician and filters the answers to obtain one or more diagnostic scripts for mobile vehicle 210. The diagnostic scripts are combined to produce a primary diagnostic script and provided to mobile vehicle 210 for execution.

Figure 3:
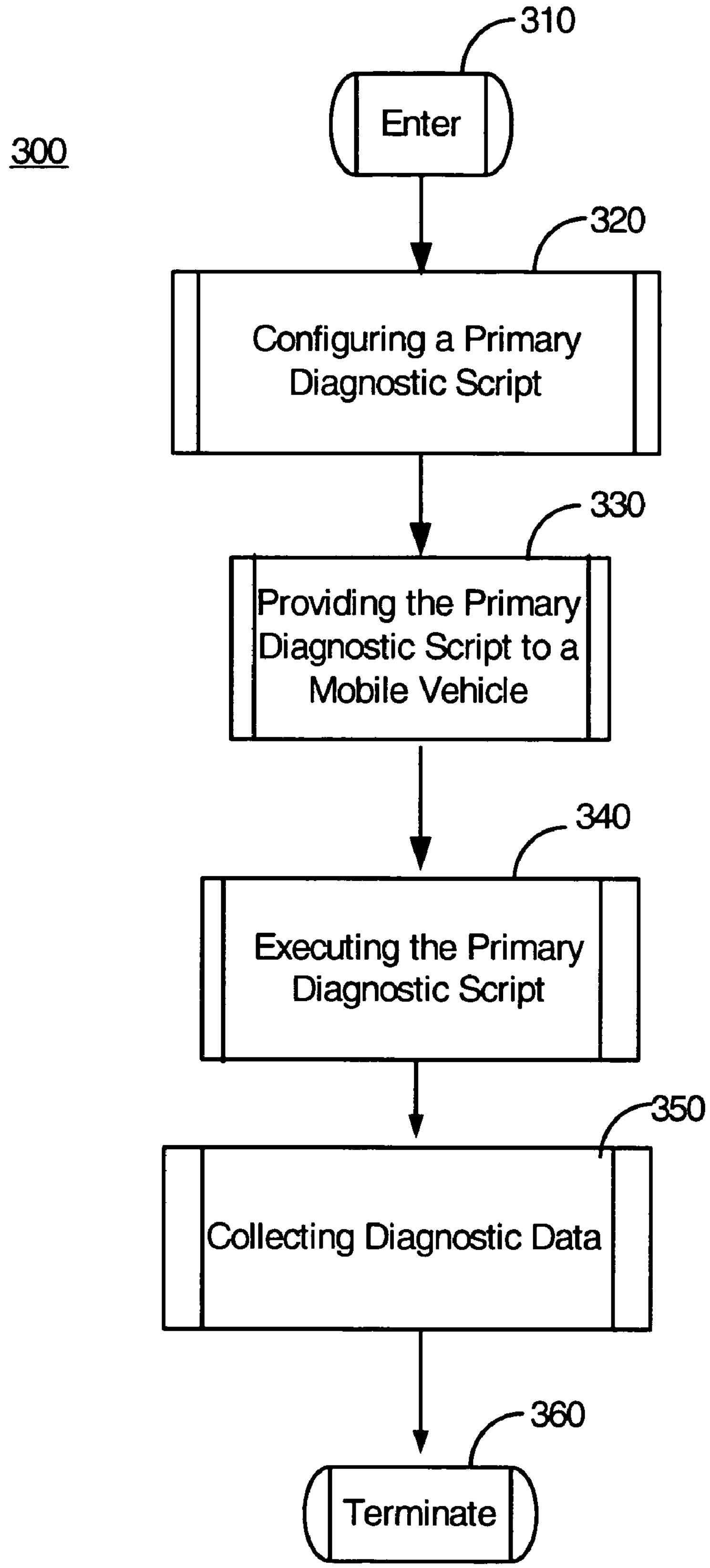
FIG. 3 is a flow diagram of one embodiment of a method of providing automated vehicle diagnostic function utilizing a telematics unit, in accordance with the present invention.

FIG. 3 is a flow diagram of an embodiment of a method of providing automated vehicle diagnostic function utilizing a telematics unit within a telematics equipped mobile vehicle. In FIG. 3, method 300 may utilize one or more systems detailed in FIGS. 1 and 2, above. The present invention can also take the form of a computer usable medium including a program for configuring an electronic module within a vehicle. The program stored in the computer usable medium includes computer program code for executing the method steps described in FIG. 3. In FIG. 3, method 300 begins at step 310.

At step 320, a primary diagnostic script is configured for a telematics equipped mobile vehicle. In one embodiment, configuring the primary diagnostic script includes determining at least one diagnostic script based on diagnostic options and retrieving the at least one determined diagnostic script. In this embodiment, the one or more diagnostic scripts are combined into the primary diagnostic script. In an example, the primary diagnostic script recreates known problem sequences when executed. In another example, the primary diagnostic script triggers data capture when specific conditions exist. In yet another example, configuring the primary diagnostic script is conducted as described in FIG. 2, above. In one embodiment, the primary diagnostic script is configured at the service provider.

At step 330, the primary diagnostic script is provided to the mobile vehicle. In one embodiment, the primary diagnostic script is provided to the mobile vehicle utilizing a mobile vehicle communication system (MVCS). At step 340, the primary diagnostic script is executed.

At step 350, diagnostic data is collected based on the executed primary diagnostic script. In one embodiment, collecting diagnostic data based on the executed primary diagnostic script includes receiving diagnostic data from vehicle system modules and storing the received diagnostic data.

At step 360, the method is terminated. In one embodiment, the method further includes analyzing the collected diagnostic data. In an example, the collected diagnostic data is analyzed within the telematics unit in the telematics equipped mobile vehicle. In another example, the collected diagnostic data is analyzed at the service provider. In another embodiment, the method further includes initiating the automated vehicle diagnostic function. In an example, initiating the automated vehicle diagnostic function includes receiving a request for automated vehicle diagnostic function from a user interface and identifying diagnostic routines based on the received request.

The above-described methods and implementation for providing automated vehicle diagnostic function utilizing a telematics unit within a telematics equipped mobile vehicle are example methods and implementations. These methods and implementations illustrate one possible approach for providing automated vehicle diagnostic function utilizing a telematics unit within a telematics equipped mobile vehicle. The actual implementation may vary from the method discussed. Moreover, various other improvements and modifications to this invention may occur to those skilled in the art, and those improvements and modifications will fall within the scope of this invention as set forth in the claims below.

The present invention may be embodied in other specific forms without departing from its spirit or essential characteristics. The described embodiments are to be considered in all respects only as illustrative and not restrictive.

What is claimed is:

1. A method of providing vehicle diagnostic function within a mobile vehicle communication system, comprising:

configuring a primary diagnostic script for a telematics equipped mobile vehicle wherein the primary diagnostic script recreates known problem sequences when executed;

providing the primary diagnostic script to the mobile vehicle;

executing the primary diagnostic script; and storing diagnostic data based on the executed primary diagnostic script such that the stored diagnostic data is made available for analysis.

2. The method of claim 1, further comprising:

analyzing the stored diagnostic data.

3. The method of claim 1, further comprising:

initiating the automated vehicle diagnostic function.

4. The method of claim 3, wherein initiating the automated vehicle diagnostic function comprises:

receiving a request for automated vehicle diagnostic function from a user interface; and identifying diagnostic routines based on the received request.

5. The method of claim 1, wherein configuring the primary diagnostic script comprises:

determining at least one diagnostic script based on diagnostic options; and retrieving the at least one determined diagnostic script, wherein one or more diagnostic scripts are combined into the primary diagnostic script.

6. The method of claim 1, wherein the primary diagnostic script triggers data capture when specific conditions exist.

7. The method of claim 1, wherein storing diagnostic data based on the executed primary diagnostic script comprises:

receiving diagnostic data from vehicle system modules; and storing the received diagnostic data.

8. The method of claim 1, wherein the diagnostic data is selected from the group consisting of: diagnostic trouble codes.

9. A system for providing automated vehicle diagnostic functions, the system comprising:

means for configuring a primary diagnostic script for a telematics equipped mobile vehicle wherein the primary diagnostic script recreates known problem sequences when executed;

means for providing the primary diagnostic script to the mobile vehicle;

means for executing the primary diagnostic script; and means for collecting diagnostic data based on the executed primary diagnostic script.

* * * * *